United States Patent Office 3,416,840
Patented Dec. 17, 1968

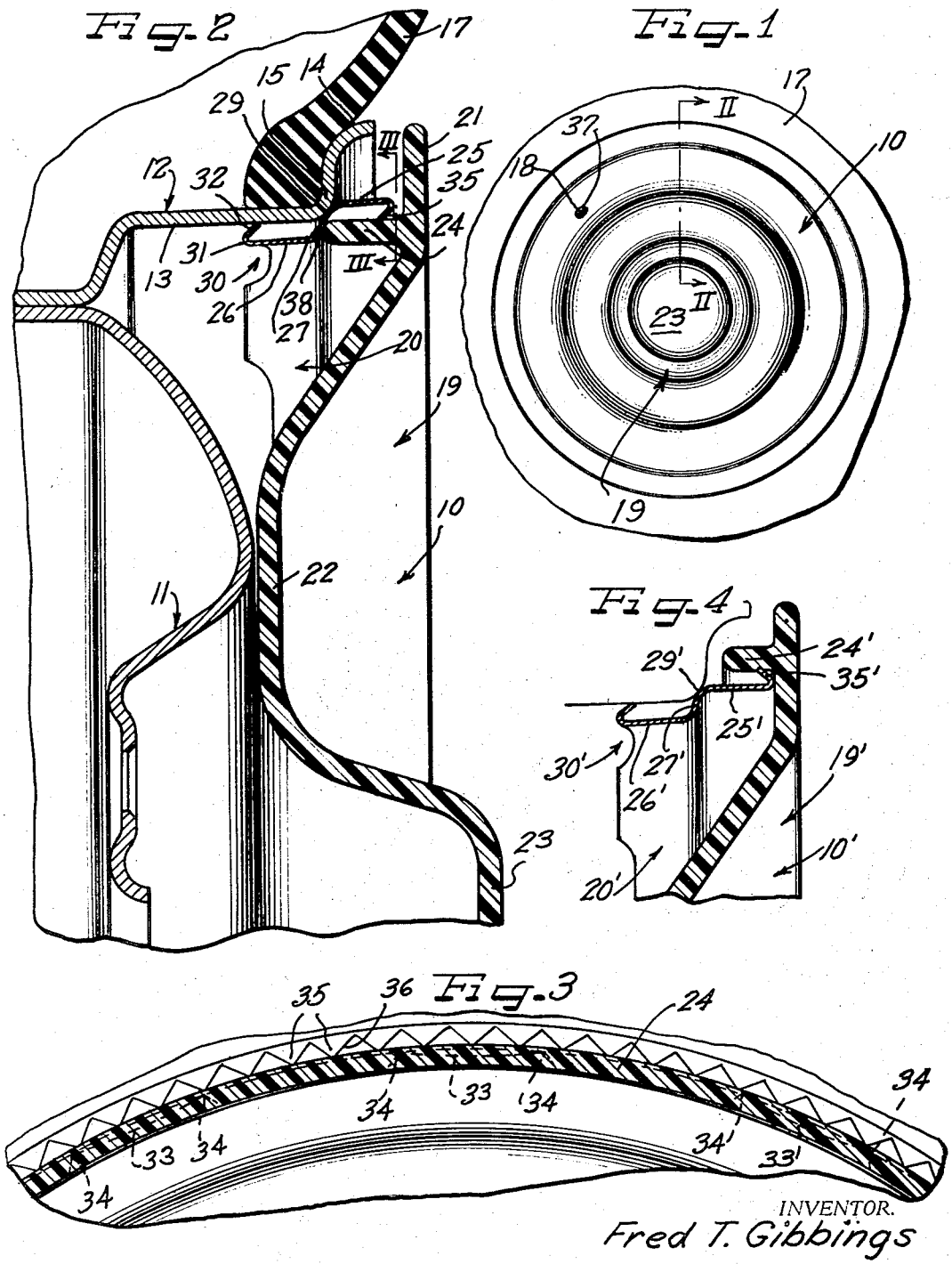

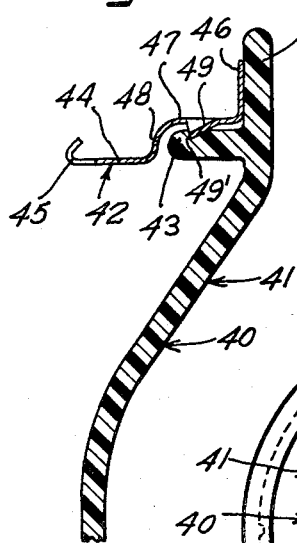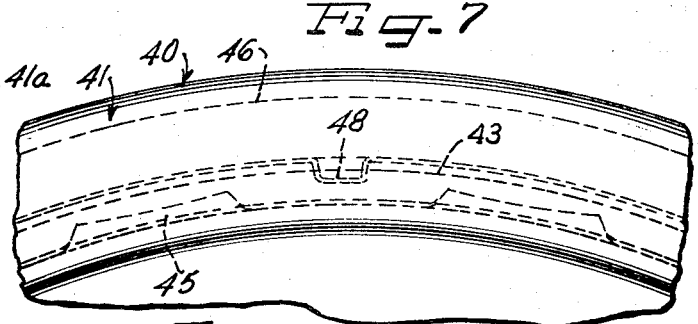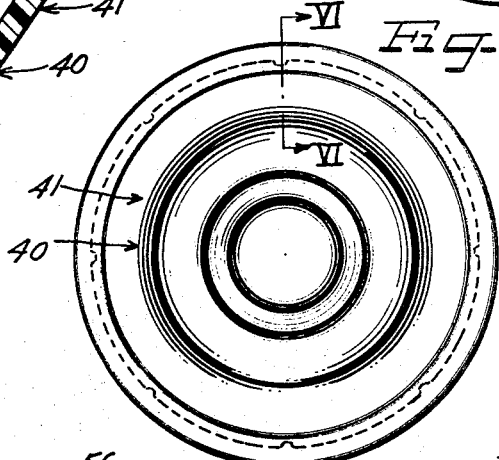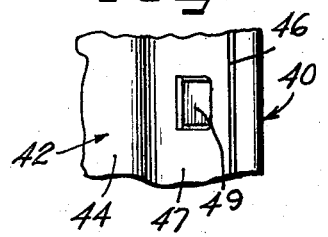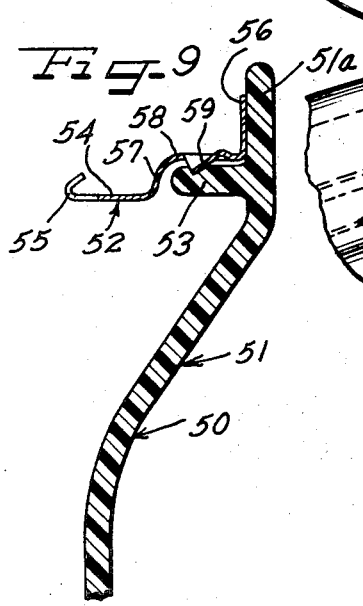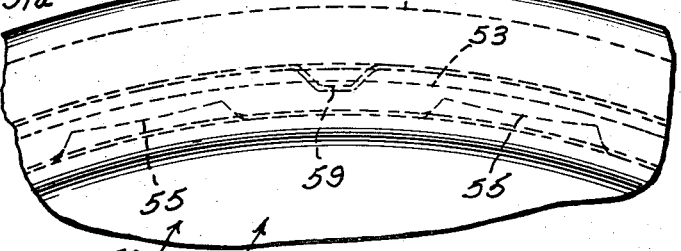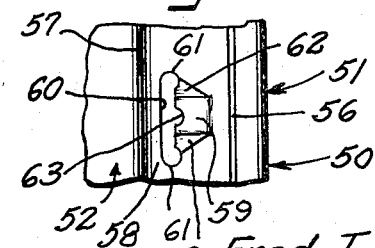

3,416,840
COVER ASSEMBLY HAVING COVER WITH A
RETAINING RING
Frederick T. Gibbings, Bloomfield Hills, Mich., assignor to North American Rockwell Corporation, a corporation of Delaware
Filed Oct. 3, 1966, Ser. No. 583,599
12 Claims. (Cl. 301—37)

ABSTRACT OF THE DISCLOSURE

A composite wheel cover assembly including a cover member and a retaining ring for securing the composite assembly on a tire rim, the cover member and the retaining ring having complementary, annularly disposed means for permitting the elements to be axially assembled and thereafter substantially preventing disassembly of the composite assembly.

---

The present invention relates to improvements in wheel structures and more particularly concerns the ornamental and protective covering of the outer sides of vehicle wheels, which in the present instance involves a cover assembly.

The present invention more particularly is concerned with a cover assembly that includes a ring member and a cover member. The cover member has an annularly arranged rib on its axially inner side, and a metal retaining ring member functions to provide means for securing the cover assembly onto a vehicle wheel in accordance with important features of this invention. It will be appreciated that the circular cover member can be formed of any suitable material such as a synthetic plastic and that the retaining ring is preferably comprised of a high grade metal such as a suitable stainless steel possessing the resilient characteristics necessary for sustaining a cover assembly of the type disclosed on a vehicle wheel.

An important object of the present invention is to provide a cover assembly including a novel ring member that can be produced at minimum cost and functions efficiently for press-on, pry-off engagement with a tire rim of a vehicle wheel.

A further object of this invention is to provide a new and improved ring member for cooperation with a cover member to provide a cover assembly whereby the ring member has improved means for its securement to an annular rib provided on the rear side of the cover member.

A still further object of this invention is to provide different types of means for securement of a ring member to an annular rib provided on the rear side of the cover member. More specifically, one feature of the invention is concerned with the provision of circumferentially spaced biting fingers at the radially outer margin of the ring member for retaining engagement with an annular rib on the rear side of the cover member, which fingers are engageable in one form on a radially outer side of the rib and in another form on a radially inner side of the rib.

Another important object is to provide means in the form of cutouts struck from the ring providing circumferentially spaced biting fingers for retaining coaction with an annular rib provided on a rear side of a cover member, and which fingers prevent axial displacement of the ring and cover members against disassembly.

Yet another object of this invention is to provide a new and improved cover assembly having a novel ring member that is attached at one end to the underside of an outer cover margin and with a novel retaining structure that is resiliently flexible for press-on, pry-off interengagement with an intermediate rim flange of a vehicle wheel.

Other objects, features and advantages of the present invention will be readily apparent from the following detailed description of several preferred embodiments thereof taken in conjunction with the accompanying drawings, in which:

FIGURE 1 is an outer side elevation of a wheel structure embodying features of invention;

FIGURE 2 is an enlarged, fragmentary, radial cross-sectional view taken essentially on the line II—II of FIGURE 1;

FIGURE 3 is an enlarged cross-sectional view as viewed on the line III—III looking in the direction indicated by the arrows as seen in FIGURE 2;

FIGURE 4 is an enlarged fragmentary, radial cross-sectional view similar to FIGURE 2 only illustrating a modified cover assembly;

FIGURE 5 is an outer side elevation of still another wheel structure embodying further features of this invention;

FIGURE 6 is an enlarged, fragmentary, radial cross-sectional view taken substantially on the line VI—VI looking in the direction indicated by the arrows as seen in FIGURE 5;

FIGURE 7 is an enlarged, fragmentary front elevation showing in full and dotted lines the relationship of the rim retaining fingers and opposite margins of the ring;

FIGURE 8 is an enlarged, fragmentary, radial view of a cutout retaining finger;

FIGURE 9 is an enlarged, fragmentary cross-sectional view similar to FIGURE 6 only illustrating yet another modified cover assembly;

FIGURE 10 is an enlarged, fragmentary, front elevation of the cover assembly shown in FIGURE 9; and FIGURE 11 is a radial view of the cutout ring retaining finger and its relationship with respect to the outer cover member shown in FIGURE 9.

As shown on the drawings:

Referring to FIGURES 1, 2 and 3, a cover assembly 10 is constructed and arranged to be applied over the outer side of a vehicle wheel including a wheel body 11 carrying a tire rim 12 having a generally axially outwardly extending radially inwardly facing intermediate rim flange 13 joining a generally radially outwardly and then axially outwardly turned terminal flange 14 with a juncture rim shoulder 15 provided at the juncture of the rim flanges 13 and 14. A pneumatic tire 17 of the tubeless variety is adapted to be carried by the tire rim 12, which tire has a conventional valve 18 for permitting the tire to be inflated.

According to the present invention, the cover assembly 10 includes a circular cover member 19 and an annular ring member 20. The cover member 19 is constructed in an economical form adapted to be made by synthetic plastic forming techniques. The ring member 20 is preferably comprised of a thin gauge stainless steel material which may have certain desired alloys therein so as to provide the ring member with the desired resilience and wear characteristics.

In this instance, the cover member 19 is of the full disc type, that is of a diameter which will substantially cover the outer side of the vehicle wheel. To this end, the cover member 19 includes an outer margin 21 that is substantially flat and which is disposed radially outwardly of a dished cover 22 and a central crown area 23.

Formed integral with the circular outer cover margins 21 at its axially inner side is an annular axial rib 24 which is cooperable with the metal ring member 20, as will hereafter be described in greater detail.

The metal ring member 20 includes a radially outer margin 25 of generally cylindrical form and a radially inner margin 26 of generally cylindrical form, which margins are joined together by a flange 27 of generally radial form. The radial flange 27 extends radially outwardly and is joined at its outer end with the outer ring margin 25. The radial flange 27 is joined at its radially inner end with the inner margin 26. The ring member 20 is provided with a rim engaging shoulder 29 at the juncture of the ring flange 27 and the outer ring margin 25 for engagement with the rim shoulder 15, the margin 25 being of greater diameter than the inner surface of the rim flange 13 and the margin 26 being of smaller diameter than the inner surface of the rim flange 13.

The metal ring member 20 also is provided with retaining structure indicated generally at 30, which retaining structure comprises circumferentially spaced radially resilient deflectable return bent cover retaining fingers. Each of the fingers includes an axial flange 31 and a generally radially and axially outwardly extending return bent flange 32. Each of the return bent flanges 32 has an arcuate area 33 (FIGURE 3) at its radially and axially outermost end providing biting edges 34—34 at opposite ends of the arc and at opposite ends of the flange 32, which biting edges 34 are adapted to engage and retainingly secure the cover assembly 10 on the radially inner surface of the tire rim flange 13.

In order to assemble the cover assembly 10 on a vehicle wheel, it is desired that the ring and cover members 19 and 20 be assembled together into a composite wheel cover assembly. This assembly procedure is effected by aligning circumferentially spaced radially and axially inwardly inclined fingers or retaining extensions 35 on the outer ring margin 25 with the annular rib 24 provided at the axially inner side of the outer margin 21 of the disc cover member 19 and thereafter causing the rib 24 and the gripping portions 35 to be retainingly engaged. In view of the angular position of the fingers 35, the fingers function to permit the cover member 19 and the ring 20 to be axially assembled and thereafter substantially resist axial separation of the ring and cover members. In order to further resist axial movement of the ring and cover members, the fingers 35 are each provided with a V-shaped biting edge 36 for biting contact with the associated rib 24 at the radially outer side of the rib 24.

After the ring and cover members are assembled together, the cover member 10 can then conveniently be assembled on a vehicle wheel by aligning the valve stem 18 with a cover opening 37 and causing the valve stem 18 to be telescoped therethrough while at the same time aligning the retaining structure or fingers 30 with the rim shoulder 15. As the cover assembly is progressively moved axially inwardly toward the body and rim parts, the resilient fingers are caused to resiliently deflect in a radially inward direction to resiliently engage the radially inner surface of the flange 13 and to thereby secure the cover assembly against accidental displacement. The cover assembly 10 is preferably pushed axially inwardly until the rim engaging shoulder 29 is engaged against the rim shoulder 15 so that the retaining fingers can effectively cooperate with the rim engaging shoulder 29 to more effectively secure the cover assembly against accidental displacement from the vehicle wheel.

The cover assembly 10 can be readily removed from the vehicle wheel by the insertion of a conventional pry-off tool beneath the outer margin of the cover and by progressively working the end of the pry-off tool beneath the rim engaging shoulder 29 so as to cause the pry-off force to be exerted against the rim engaging shoulder and thereby enable the cover assembly to be dislodged from the vehicle wheel as an integral structure. In order to further augment the retaining characteristics of the fingers 32 and the teeth or fingers 35, the rib 24, at its axially inner end 38, is engaged against the radial ring flange 27 thereby effectively bottoming the rib 24 against the tire rim 15 through the rim engaging shoulder 29.

The proportions of the ring portions 25, 26 and 27 and the rib 24 are such that the outer circular margin 21 of the cover 19 is axially spaced from the rim flange 14, thus permitting the insertion of a pry-off tool beneath the rim engaging shoulder 29 so that the pry-off force is exerted against the resilient ring 20 rather than against the cover 19.

In FIGURE 4 is shown a modified cover assembly indicated generally at 10'. The cover assembly 10' includes an outer synthetic plastic cover member or disc 19' and a ring member 20'. The cover member 19' has an annular rib 24' similar to the annular rib 24 on the cover member 19 shown in FIGURES 1–3.

The ring member 20' is constructed similarly to the ring 20 shown in FIGURE 2, only it is provided with an outer ring margin 25' having axially inwardly radially outwardly directed retaining fingers or retaining extensions 35' which are adapted to engage on the radially inner side of the annular cover rib 24' for sustaining the cover member 19' and the ring member 20' in assembly together. In addition to the foregoing, the ring member 20' is further provided with an annular rim engaging area 29' that is disposed at the juncture of the outer ring margin 25' with radial rim flange 27'. A retaining structure 30' is provided on inner ring margin 26' and it coacts with the intermediate rim flange in a manner similar to the ring member 20 shown in FIGURE 2. The ring member 20' is adapted to be assembled with the cover member 19' in much the same manner as the corresponding components of the cover assembly 19 shown in FIGURE 2, only in this instance the fingers 35' are adapted to resiliently deflect in a radially inward direction to create a biased engagement between the fingers and the annular rib 24' on the cover member 19'. The cover assembly 19' is adapted to be assembled and removed from a vehicle wheel in the same manner previously described.

Shown in FIGURES 5–8 is still another modified cover assembly indicated generally at 40. This cover assembly includes an outer cover member 41 which is similar to the ones previously described as well as an inner metallic ring member 42. The inner metallic ring member 42 is cooperable with the annular rib 43 on the axially inner side of the outer cover member 41. The ring member 42 includes an inner margin 44 having a retaining structure 45 that is similar to the retaining structure previously described. The inner ring member 42 includes a radially outwardly extending outer margin 46 that is adapted to engage in face-to-face relation with the axially inner side of outer cover margin 41a. Joined with the axially outer margin 46 of the ring member 42 is an axially extending step flange 47 which is, in turn, connected to a radially extending step flange 48 with the step flange 48 being joined at its radially inner end with the axially inner margin 44.

In accordance with important features of this modification, the axial ring flange 47 is provided with novel retaining extensions 49 which are of a generally U-shaped configuration as shown in FIGURE 7 and depend in a generally axially inwardly and radially inwardly direction from the axial rim flange 47. These cutout extensions 49 are adapted to coact with the annular rib 43 on the cover member 41 to sustain the ring member 42 and the cover member 41 in assembly together. As these members are assembled, the outer ring margin 47 is adapted to yield in a radial direction to enable the retaining extensions 49 to engage in edgewise relation with the radially outer surface of the annular rib 43 in biased engagement therewith. It will be noted that the biasing action developed between the retaining extensions 49 and the rib 43 is such that an outermost edge 49' of each of the retaining extensions 49 becomes embedded in the synthetic plastic material of the annular rib 43 so as to further resist axial displacement of the ring and cover members and so that the outer ring margin 46 can be maintained abutment against the radially inner face of the outer cover margin 41a.

The cover assembly 40 is adapted to be assembled and removed from a vehicle wheel in the same manner previously described. Also, the cover member 41 and ring member 42 are adapted to be assembled in the manner previously described.

Illustrated in FIGURES 9–11 is still another modified cover assembly designated generally at 50. The cover assembly 50 includes a cover member 51 and a ring member 52. The cover member 51 has an annular rib 53 for coaction with the ring member in much the same manner previously described, only in this instance the ring extensions are of a different configuration as will hereafter be described in further detail.

The ring member 52 includes an inner ring margin 54 having finger retaining structure 55 thereon for sustaining the ring member 52 and the cover member 51 on a vehicle wheel, as previously described. This ring member 52 further includes a radially outwardly extending axially outer margin 56 that is adapted to be engaged in face-to-face relation with an axially inner side of outer cover margin 51a. The ring margins 54 and 56 are joined together by means of a pair of step flanges 57 and 58 and the axial or radially outermost step flange has a series of cutout retaining extensions indicated generally at 59. Each of the extensions 59 extend generally radially and axially inwardly for biting engagement with the annular rib 53. A cutout area 60 is provided on an axially inner side of the extensions 59 and this slot area is also provided with enlarged keyhole shaped slot areas 61—61 at circumferentially opposite ends of the slot 60 to minimize any tendency for the finger side flanges 62—62 to become damaged when the finger is placed under the stress of road conditions. In order to further augment the biting action of the retaining extension 59, it is further provided with a central notched area 63 to provide reduced ares of contact between the retaining extensions 59 with the annular rib 53. In this way, the biting action of the resiliently deflectable retaining extensions 59 can be increased.

The cover assembly 50 is adapted to be assembled and removed from a vehicle wheel in much the same manner as previously described. Also, the cover member 51 and the ring member 52 can be assembled much the same as previously described.

I claim:

1. A composite wheel cover assembly for use in a wheel structure including a tire rim having an intermediate axially extending rim flange surface, said composite wheel cover assembly comprising:

a cover member of non-metallic material having a circular outer marging and annularly disposed connecting means formed integrally with said circular outer margin and projecting axially therefrom, said connecting means having axially extending surface means, and an annular retaining ring radially aligned with and projecting axially from said circular outer margin, said annular retaining ring including a first generally cylindrical portion of greater diameter than the intermediate rim flange surface and a second generally cylindrical portion of smaller diameter than the intermediate rim flange surface, first retaining means comprising a plurality of resilient gripping tooth portions projecting from said first cylindrical ring portion resiliently engaging said axially extending surface means of said connecting means, said gripping portions being proportioned and positioned to permit said cover member and said retaining ring to be axially assembled into a composite wheel cover assembly and thereafter substantially preventing disassembly of said composite wheel cover assembly, second retaining means comprising a plurality of radially resilient portions projecting from said second cylindrical ring portion to engage the intermediate rim flange surface of the tire rim, said resilient portions being proportioned and positioned to permit said composite wheel cover assembly to be pressed onto and pried off of the tire rim as an integral structure, said annular retaining ring further including an annular generally radial portion interconnecting said first and second cylindrical ring portions for axially abutting the tire rim radially outwardly of the intermediate rim flange surface when said composite wheel cover assembly is mounted on the tire rim for providing precise axial positioning of said annular retaining ring relative to said tire rim.

2. A composite wheel cover assembly as defined by claim 1 in which said connecting means is a continuous annular axial rib.

3. The composite wheel cover assembly of claim 2 further characterized by said gripping portions being disposed on the radially outer surface of said annular axial rib and inclined radially outwardly and axially away from said circuldar outer margin into edgewise biting engagement with said rib.

4. The composite wheel cover assembly of claim 2 further characterized by said gripping portions being disposed on the radially inner surface of said annular axial rib and inclined radially outwardly and axially away from said circular outer margin into edgewise biting engagement with said rib.

5. The composite wheel cover assembly of claim 2 further characterized by said gripping portions comprising a series of V-shaped biting teeth.

6. The composite wheel cover assembly of claim 2 further characterized by said ring having cutouts in its first cylindrical portion with said gripping portions extending from said cutouts generally radially inwardly and axially away from said circular outer margin into edgewise biting engagement with said rib.

7. The composite wheel cover assembly of claim 2 further characterized by said ring having cutouts in its first cylindrical portions with said gripping portions extending from said cutouts generally radially inwardly and axially away from said circular outer margin and each having supporting side flanges at opposite sides and with keyhole notch areas merged with the sides to minimize metal tears at the juncture of the opposite sides of the ring member.

8. A composite wheel cover assembly as defined by claim 2 in which said annular radial portion is located intermediate said first and second cyindrical portions for axially abutting the tire rim radially outwardly of the intermediate rim flange surface when said composite wheel cover assembly is mounted on the tire rim, said radial portion also axially abutting said annular rib when said retaining ring is mounted on said cover member, whereby abutment between said radial portion and both said annular rib and the tire rim provides precise axial positioning of said entire composite wheel cover assembly relative to the time rim.

9. A composite wheel cover assembly as defined by claim 8 in which said annular rib has an axial length sufficient to provide substantial axial clearance between said circular outer margin and the tire rim when said composite wheel cover assembly is mounted on the tire rim so as to permit the insertion of a pry-off tool between said radial portion and the tire rim for the purpose of removing said composite wheel cover assembly from the tire rim.

10. In a wheel structure having a tire rim with an intermediate rim flange, the improvement comprising a cover assembly including a metal retaining ring member and a circular non-metallic cover member, the circular cover member having an annular rib projecting axially inwardly of an outer margin of the circular cover member, the metal retaining ring member having an axially outer ring margin and with the ring further having circumferentially spaced retaining extensions in retaining engagement with said rib, the ring member having an axially inner ring margin of smaller diameter than its outer ring margin and of smaller diameter than the intermediate rim flange and with said inner ring marging having circumferentially spaced retaining fingers for securing the cover assembly in press-on, pry-off assembly with the tire rim, the ring member further having an annular stepped area between its inner and outer ring margins defining an annular rim engaging shoulder and with said fingers being cooperable with the intermediate rim flange to secure the rim engaging shoulder in bottomed engagement against the tire rim.

11. The wheel structure of claim 10 further characterized by said axial rib being in generally axial alignment with the retaining fingers in backed-up relation therebehind and with said retaining extensions being retainingly engaged with a radially outer side of said axial rib.

12. A metal annular retaining ring for attachment at one end to a tire rim and at an opposite end to a cover member, said retaining ring comprising:

first and second generally cylindrical axially spaced-apart portions, said first cylindrical portion having a greater diameter than said second cylindrical portion, first retaining means comprising a plurality of gripping tooth portions projecting from said first cylindrical ring portion and adapted to engage annularly disposed connecting means on the cover member, said gripping portions being proportioned and positioned so as to permit said retaining ring to be axially assembled with the cover member into a composite structure and thereafter substantially prevent disassembly of the composite structure, second retaining means comprising a plurality of radially resilient portions projecting radially outwardly from said second cylindrical ring portion to engage a generally cylindrical flange surface on the tire rim, said resilient portions being proportioned and positioned so as to permit said retaining ring to be pressed onto and pried off of the tire rim, and an annular generally radial portion interconnecting said first and second cylindrical ring portions, said radial portion adapted to axially abut the tire rim to provide precise axial positioning of said retaining ring relative to the tire rim.

References Cited

UNITED STATES PATENTS

| | | | |
|---|---|---|---|
| 2,522,271 | 9/1950 | Horn | 301—37 |
| 2,566,345 | 9/1951 | Lyon | 301—37 |
| 2,842,403 | 7/1958 | Lyon | 301—37 |
| 2,926,958 | 3/1960 | Lyon | 301—37 |
| 3,317,249 | 5/1967 | Dagobert | 301—37 |
| 3,252,738 | 5/1966 | Huntley | 301—37 |
| 3,265,441 | 8/1966 | Baldwin | 301—37 |
| 2,660,480 | 11/1953 | Lyon | 301—37 |
| 2,725,257 | 11/1955 | Maurer | 301—37 |
| 3,320,002 | 5/1967 | Buerger | 301—37 |

FOREIGN PATENTS 1,061,278  11/1953  France.

RICHARD J. JOHNSON, *Primary Examiner.*

UNITED STATES PATENT OFFICE
CERTIFICATE OF CORRECTION

Patent No. 3,416,840                December 17, 1968

Frederick T. Gibbings

It is certified that error appears in the above identified patent and that said Letters Patent are hereby corrected as shown below:

Column 2, line 67, "margins" should read -- margin --. Column 3, line 46, "member" should read -- assembly --. Column 4, lines 28 and 29, "memzer" should read -- member --. Column 5 line 27, "extend" should read -- extends --; line 37, "ares" should read -- areas --; line 52, "marging" should read -- margi --. Column 6, line 21, "outwardly" should read -- inwardly --; line 22, "circuldar" should read -- circular --; line 41, "porti should read -- portion --; line 46, "of", second occurrence, sho read -- with --; line 59, "time" should read -- tire --. Column 7, line 8, "marging" should read -- margin --.

Signed and sealed this 17th day of March 1970.

(SEAL)

Attest:

Edward M. Fletcher, Jr.

Attesting Officer

WILLIAM E. SCHUYLER, JR.

Commissioner of Patents